(12) United States Patent
Mancl

(10) Patent No.: US 12,506,380 B2
(45) Date of Patent: Dec. 23, 2025

(54) BEARING SEAL FOR MOTORS

(71) Applicant: Scott C. Mancl, Johnson City, TN (US)

(72) Inventor: Scott C. Mancl, Johnson City, TN (US)

( * ) Notice: Subject to any disclaimer, the term of this patent is extended or adjusted under 35 U.S.C. 154(b) by 228 days.

(21) Appl. No.: 18/213,831

(22) Filed: Jun. 24, 2023

(65) Prior Publication Data

US 2024/0429772 A1    Dec. 26, 2024

(51) Int. Cl.
*H02K 5/173*    (2006.01)
*H02K 5/10*     (2006.01)
*H02K 7/00*     (2006.01)

(52) U.S. Cl.
CPC .......... *H02K 5/1732* (2013.01); *H02K 5/10* (2013.01); *H02K 7/003* (2013.01)

(58) Field of Classification Search
CPC ......... H02K 5/1732; H02K 5/10; H02K 7/003
See application file for complete search history.

(56) References Cited

U.S. PATENT DOCUMENTS

| | | |
|---|---|---|
| 2,263,842 A | 11/1941 | Gross |
| 2,829,286 A | 4/1958 | Britz |
| 3,056,608 A | 10/1962 | Flynn |
| 3,060,335 A | 10/1962 | Greenwald |
| 3,087,078 A | 4/1963 | Brown |
| 3,371,613 A | 3/1968 | Dahlgren et al. |
| 3,443,519 A | 5/1969 | White |
| 3,525,001 A | 8/1970 | Erickson |
| 3,653,785 A | 4/1972 | Dahlgren et al. |
| 3,733,150 A | 5/1973 | Porter et al. |
| 3,932,070 A | 1/1976 | Porter et al. |
| 4,088,424 A | 5/1978 | Hyatt et al. |
| 4,139,203 A | 2/1979 | Garrison |
| 4,174,070 A | 11/1979 | Lau et al. |
| 4,194,745 A | 3/1980 | McDougal |
| 4,226,575 A | 10/1980 | Hyatt et al. |
| 4,347,442 A | 8/1982 | White et al. |
| 4,433,812 A | 2/1984 | Grime |
| 4,482,378 A | 11/1984 | Riou et al. |
| 4,527,960 A | 7/1985 | DeSisto |
| RE32,027 E | 11/1985 | Hyatt et al. |
| 4,838,763 A | 6/1989 | Kramer et al. |
| 4,865,332 A | 9/1989 | Ruetz |
| 4,890,988 A | 1/1990 | Kramer et al. |
| 5,307,994 A | 5/1994 | Hieronymus |
| 5,616,973 A | 4/1997 | Khazanov et al. |

(Continued)

*Primary Examiner* — Terrance L Kenerly
(74) *Attorney, Agent, or Firm* — bobharter.com; Robert J. Harter

(57) ABSTRACT

Some examples of a motor bearing seal include silicone glue bonding a Teflon tube to the inboard end of a motor housing. The Teflon tube's ID is in close sliding contact with the OD of a sleeve on the motor's shaft. The motor housing's inboard end, the silicone glue and the Teflon tube are stationary, while the sleeve and the shaft rotate. In some examples, the shaft supports a stack of fan wheels held in axial compression by a nut on the end of the shaft. In some examples, another adhesive sealingly bonds the ID of the sleeve to the shaft. In some examples, a relatively thin gasket is axially compressed between the sleeve and the stack of the fan wheels. In some examples, the silicone glue contains embedded reinforcement, e.g., fibers, mesh, or protrusions extending integrally from the motor's inboard end.

20 Claims, 6 Drawing Sheets

(56) References Cited

U.S. PATENT DOCUMENTS

| | | | |
|---|---|---|---|
| 5,655,714 A | 8/1997 | Kieffer et al. | |
| 5,661,356 A | 8/1997 | Fisher et al. | |
| 5,704,717 A | 1/1998 | Cochimin | |
| 5,726,511 A | 3/1998 | Kusase et al. | |
| 5,803,367 A | 9/1998 | Heard et al. | |
| 5,894,180 A | 4/1999 | Volz et al. | |
| 6,247,702 B1 | 6/2001 | Long et al. | |
| 6,316,856 B1 | 11/2001 | Kusaki et al. | |
| 6,379,127 B1 | 4/2002 | Andrews et al. | |
| 6,472,786 B1 | 10/2002 | McCauley et al. | |
| 6,685,445 B2 | 2/2004 | Wu | |
| 6,692,202 B2 | 2/2004 | Katsuzawa et al. | |
| 6,702,203 B2 | 3/2004 | Jou | |
| 6,715,765 B2 | 4/2004 | Machida | |
| 6,779,964 B2 | 8/2004 | Dial | |
| 6,796,514 B1 | 9/2004 | Schwartz | |
| 6,952,062 B1 * | 10/2005 | Mancl | H02K 7/14 310/90 |
| 6,987,338 B1 | 1/2006 | Lavasser et al. | |
| 7,011,452 B2 | 3/2006 | Suzuki et al. | |
| 7,117,961 B2 | 10/2006 | Yong et al. | |
| 7,265,468 B1 * | 9/2007 | Mancl | H02K 5/10 310/90 |
| 7,291,192 B1 | 11/2007 | Lavasser et al. | |
| 7,481,447 B2 | 1/2009 | Stevens | |
| RE41,212 E | 4/2010 | Lavasser et al. | |
| 2003/0001444 A1 | 1/2003 | Coles et al. | |
| 2003/0116921 A1 | 6/2003 | Coles et al. | |
| 2004/0170346 A1 | 9/2004 | Komeda et al. | |
| 2006/0033317 A1 | 2/2006 | Stevens | |
| 2006/0071097 A1 | 4/2006 | Gilauser et al. | |
| 2015/0084464 A1 * | 3/2015 | Ramdane | H02K 1/28 310/90 |
| 2016/0312784 A1 * | 10/2016 | Patel | F04D 29/5806 |

\* cited by examiner

BEARING SEAL FOR MOTORS

FIELD OF THE INVENTION

The subject disclosure generally pertains to motor driven fans and pumps and more specifically to means for protecting the motor's bearings from water and other contaminants.

BACKGROUND

Vacuum appliances, such as a dry air vacuum cleaner, a wet/dry vacuum cleaner, a water extractor (e.g., carpet cleaner), etc., often include an electric motor that drives an impeller to draw in dirty or moist air. Air contaminated with dirt or moisture, unfortunately, can damage a motor bearing that is near the impeller, particularly if the bearing is of a high speed universal motor, such as those typically found in lightweight portable appliances. Various means for protecting motor bearings are disclosed in U.S. Pat. Nos. 4,226,575; 4,527,960; 5,482,378; 3,733,150; 3,932,070; 4,088,424; Re. 32,027; and 6,472,786; all of which are specifically incorporated herein by reference.

Some vacuum appliances comprise high-velocity low pressure fans (HVLP fans or turbines), which typically include a multi-stage stacked series of fan wheels driven by a high speed motor. The term, "HVLP," as used herein, refers to high-velocity low-pressure fans operating at 15,000 to over 30,000 rpm for compressing air to less than 15 psig, and delivering air up to 10 psig to a paint sprayer.

DETAILED DESCRIPTION

Figure 1:
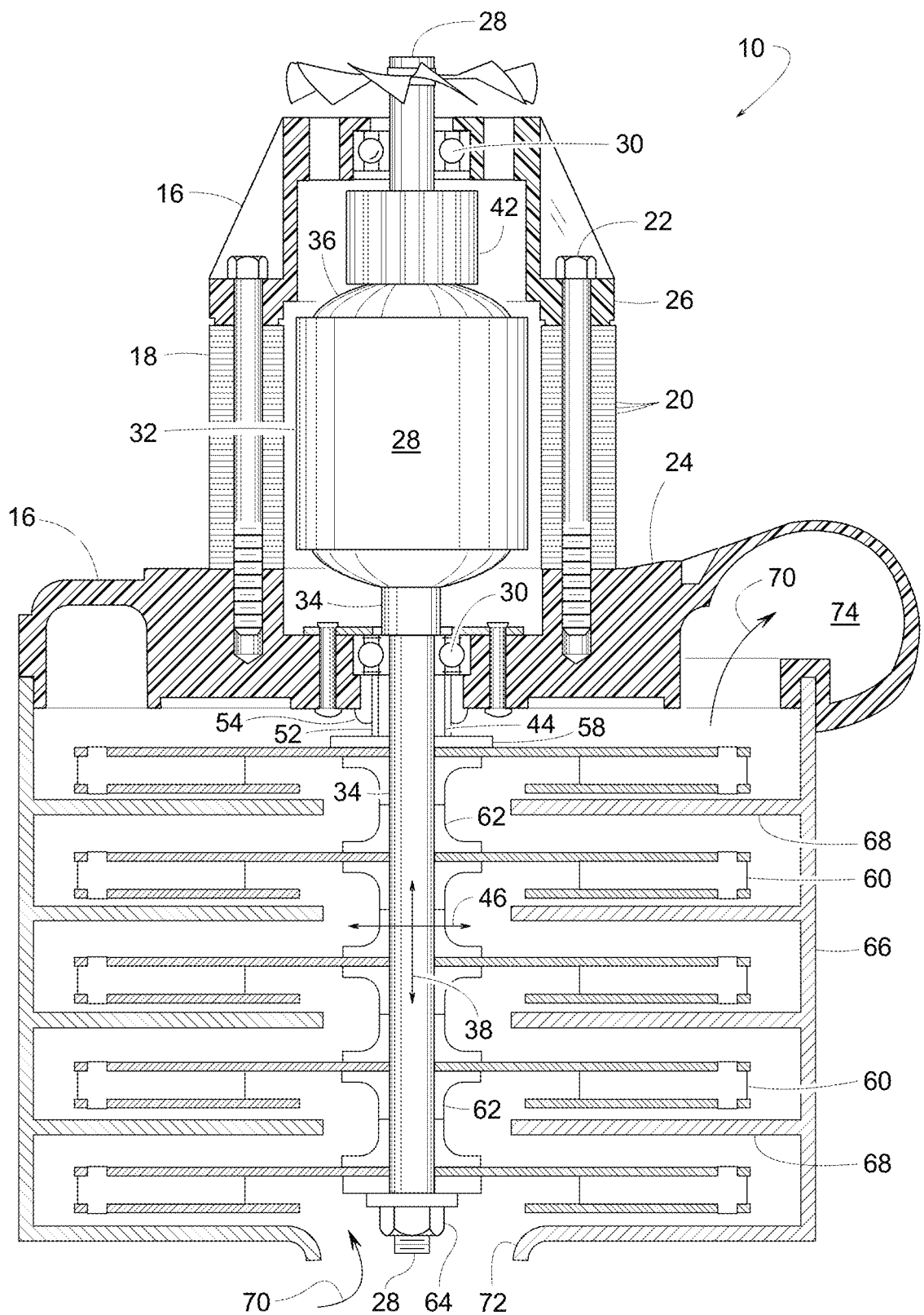
FIG. 1 is a cross-sectional view of an example motor system constructed in accordance with the teachings disclosed herein.

FIGS. 1-7 show an example motor system 10 and variations thereof. Some examples of motor system 10 include universal motors, AC motors, DC motors, induction motors, brushless motors, brushed motors, permanent magnet motors, etc. The motor system 10 can be designed for various uses. Some example uses include blowing air, sucking air, pumping liquid, compressors, vacuum cleaners, wet/dry vacs, water extractors 12 (FIG. 2), HVLP paint sprayers 14 (FIG. 3), etc. The term, "HVLP," as used herein, refers to high-velocity low-pressure fans operating at 15,000 to over 30,000 rpm for compressing air to less than 15 psig, and delivering air up to 10 psig to a paint sprayer 14. HVLP fans or turbines typically comprise a multi-stage stacked series of fan wheels driven by a high speed motor.

In some examples, the motor system 10 comprises a motor housing 16, a stator 18 with a plurality of laminations 20, a screw 22 for clamping the stator 18 between an inboard end 24 and an outboard end 26 of the motor housing 16, and a rotor assembly 28 supported by a set of roller bearings 30. The term, "rotor assembly" refers to the main rotating member of any electric motor.

In some examples, the rotor assembly 28 comprises an armature 32 and a shaft 34. The armature 32 has windings 36 electromagnetically interacting with the stator 18. The shaft 34 is elongate and extends in an axial direction 38 through a shaft opening 40 in the inboard end 24 of the motor housing 16. The shaft 34 supports the armature 32. Some examples of the rotor assembly 28 include a known commutator 42 electrically coupled to the windings 36. Some examples of the rotor assembly 28 include a sleeve 44 on the shaft 34. The various components of the rotor assembly 28 rotate together as a unit.

The roller bearings 30 allow the rotor assembly 28 to freely rotate while providing the shaft 34 with support in a radial direction 46 that is perpendicular to the axial direction 38. The roller bearings 30 also support the shaft 34 in the axial direction 38 so as to centrally position the armature 32 proximate the stator 18.

Each roller bearing 30 (also known as a rolling element bearing) includes an inner race 30a and an outer race 30b with multiple rolling elements 48 (e.g., balls or cylinders) between the two races 30a and 30b. Some examples of the roller bearings 30 have one or more annular shields 50 to help protect the rolling elements 48 and the inner surfaces of the races 30a and 30b from contamination (e.g., moisture, soap, debris, etc.).

To further protect the roller bearings 30 from contamination, some examples of the motor system 10 include additional sealing components. Some examples of such sealing components include a tube 52 encircling the sleeve 44 or the shaft 34, an outer adhesive 54 bonding the tube 52 to the inboard end 24 of the motor housing 16, an inner adhesive 56 (FIGS. 6 and 7) bonding the sleeve 44 to the shaft 34, and/or a relatively thin gasket 65 (FIGS. 6 and 7) axially compressed between a support washer 58 and the sleeve 44 (or shaft 34).

The various sealing components are particularly useful in examples where motor system 10 includes a plurality of fan wheels 60 mounted in a stacked arrangement on the shaft 34. A series of spacers 62 establishes the proper axial spacing of the fan wheels 60 on the shaft 34. A threaded nut 64 screwed onto the end of the shaft 34 tightly clamps the fan wheels 60, the spacers 62, the sleeve 44 the bearing's inner race 30a, and the support washer 58 to the shaft 34. In some examples, proper axial spacing of the fan wheels 60 is ensured by making the fan wheels 60, the spacers 62, the support washer 58, the sleeve 44, the bearing's inner race 30a, and the shaft 34 out of a relatively incompressible material, such as aluminum, steel or some other metal.

Figure 2:
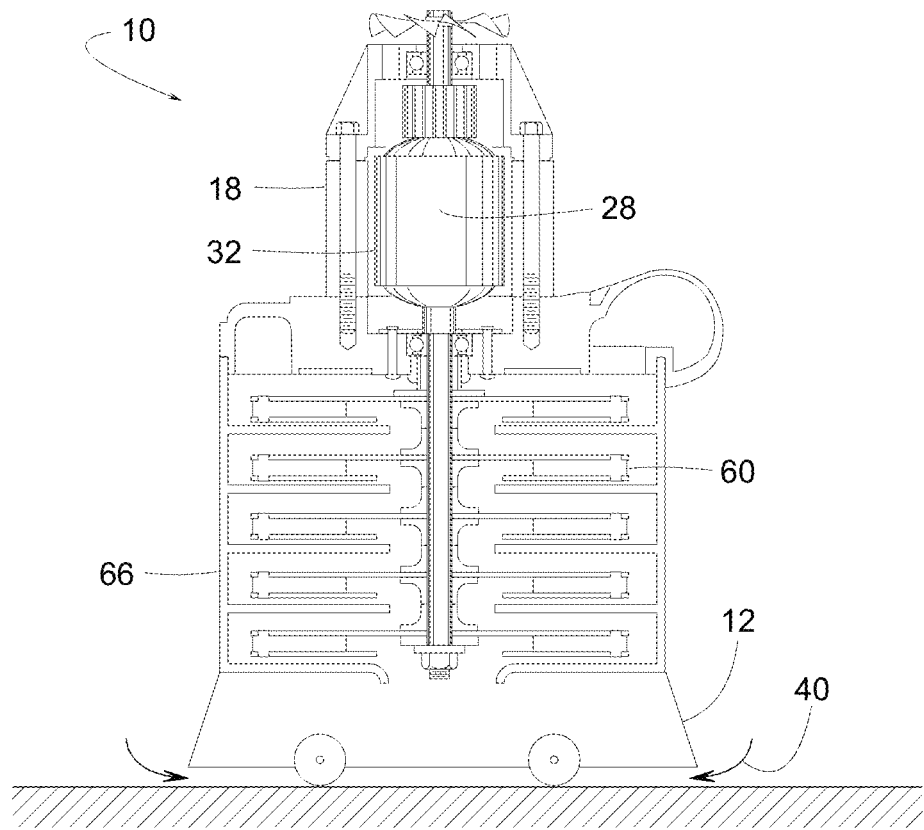
FIG. 2 is a cross-sectional view showing the motor system used as a water extractor for cleaning floors.
Figure 3:
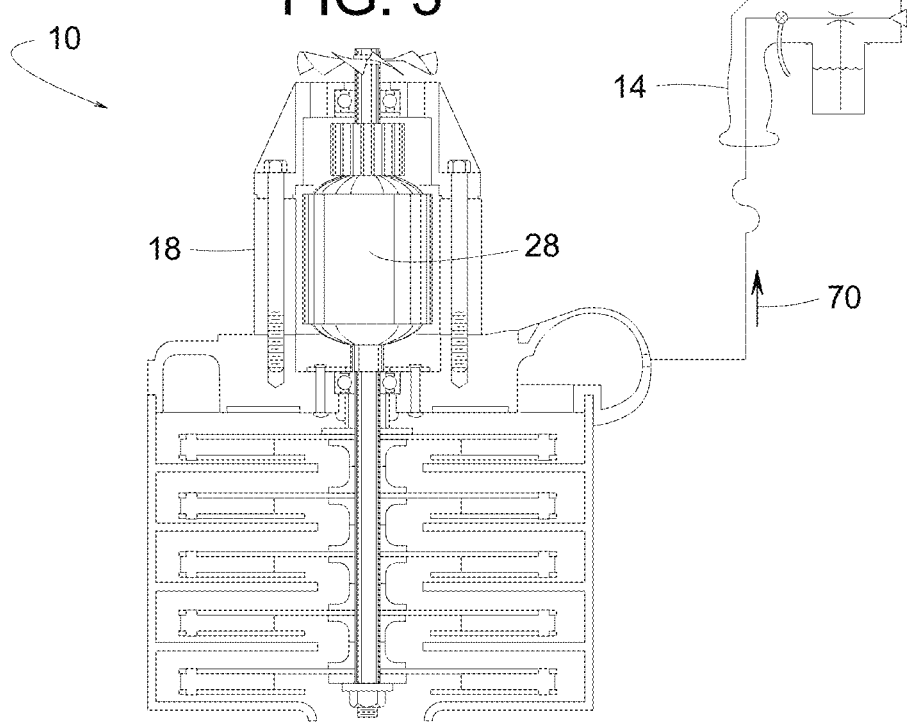
FIG. 3 is a cross-sectional view showing the motor system used as an HVLP paint sprayer.

The shaft 34 spins the fan wheels 60 and the other clamped components within a fan housing 66. The fan housing 66 includes a series of stationary dividers 68 that divide the stack of fan wheels 60 into multiple stages of centrifugal compression, so the pressure of air 70, or other fluid, progressively increases as the air 70 is drawn into a fluid inlet 72 of the fan housing 66 and is forced out through a fluid outlet 74. In some examples, the fluid outlet 74 is defined by the inboard end 24 of the motor housing 16. The fluid outlet 74 oriented as shown in FIGS. 1-3 configures the motor system 10 in a bypass tangential exhaust configuration. It should be appreciated by those of ordinary skill in the art, however, that other configurations are well within the scope of the invention. For instance, in some examples, the motor system 10 has what is known in the industry as a peripheral exhaust configuration.

Figure 4:
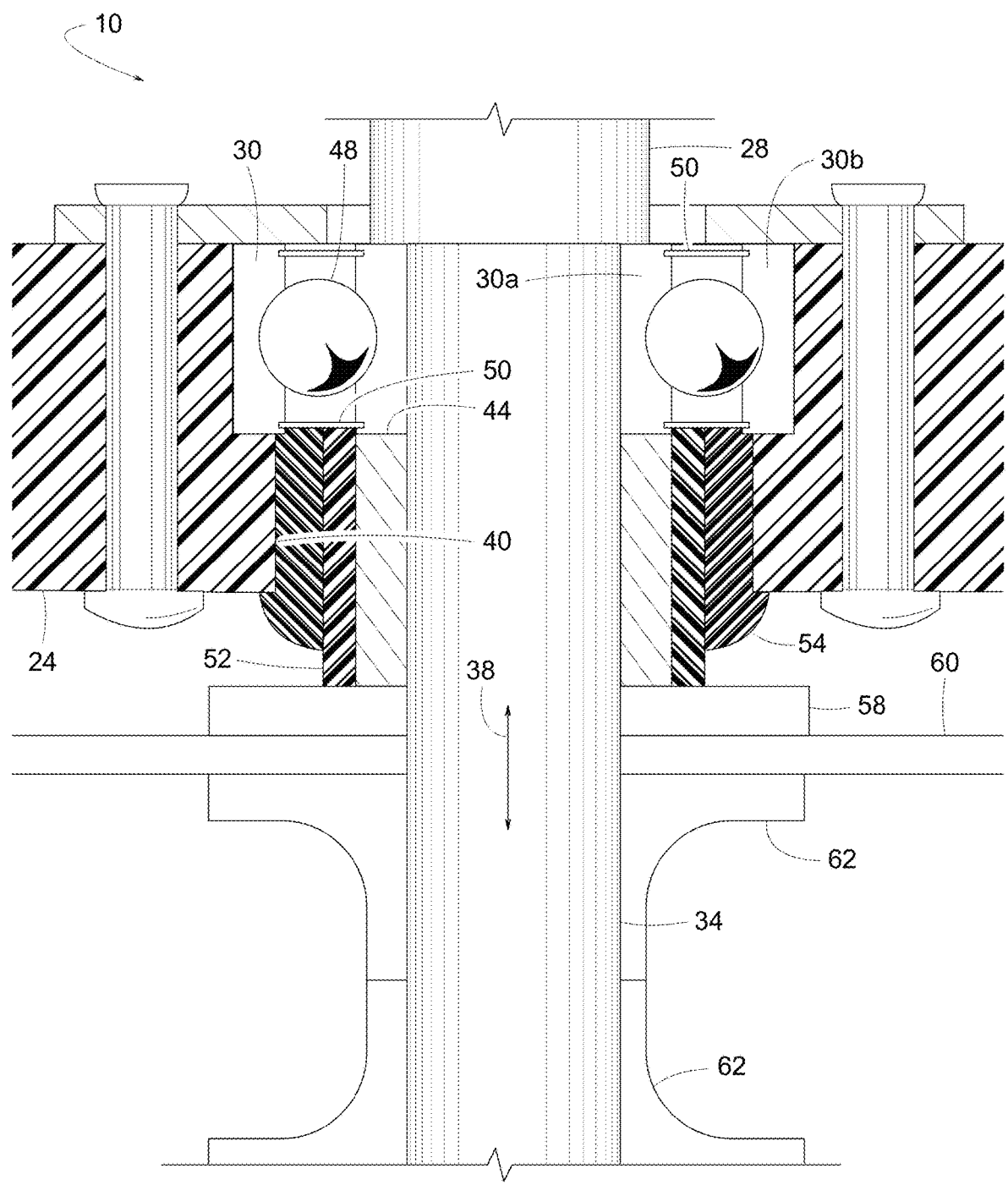
FIG. 4 is an enlarged cross-sectional view showing a bearing sealing area at an inboard end of the motor housing of FIG. 1.
Figure 5:
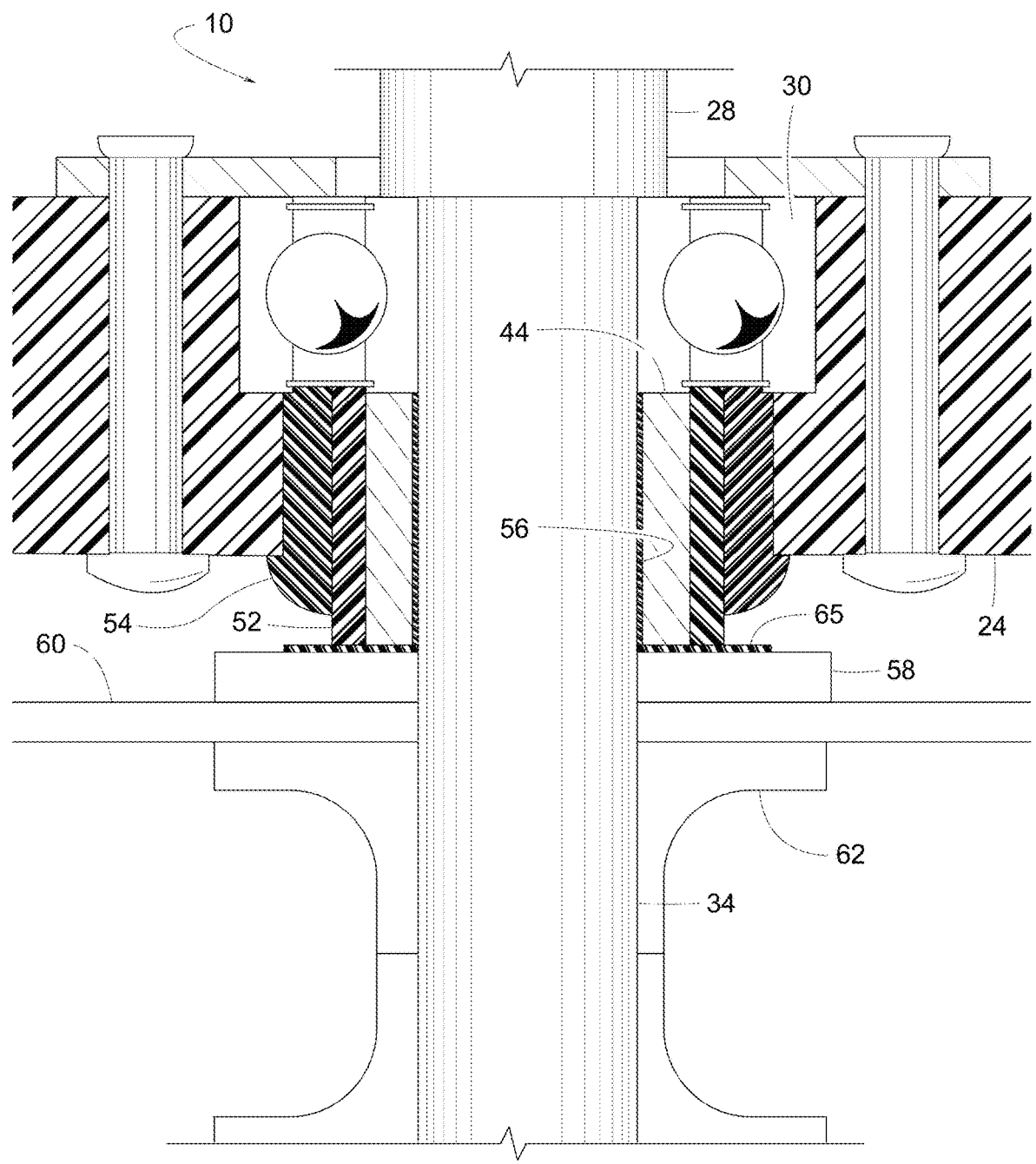
FIG. 5 is cross-sectional view similar to FIG. 4 but with additional sealing elements.
Figure 6:
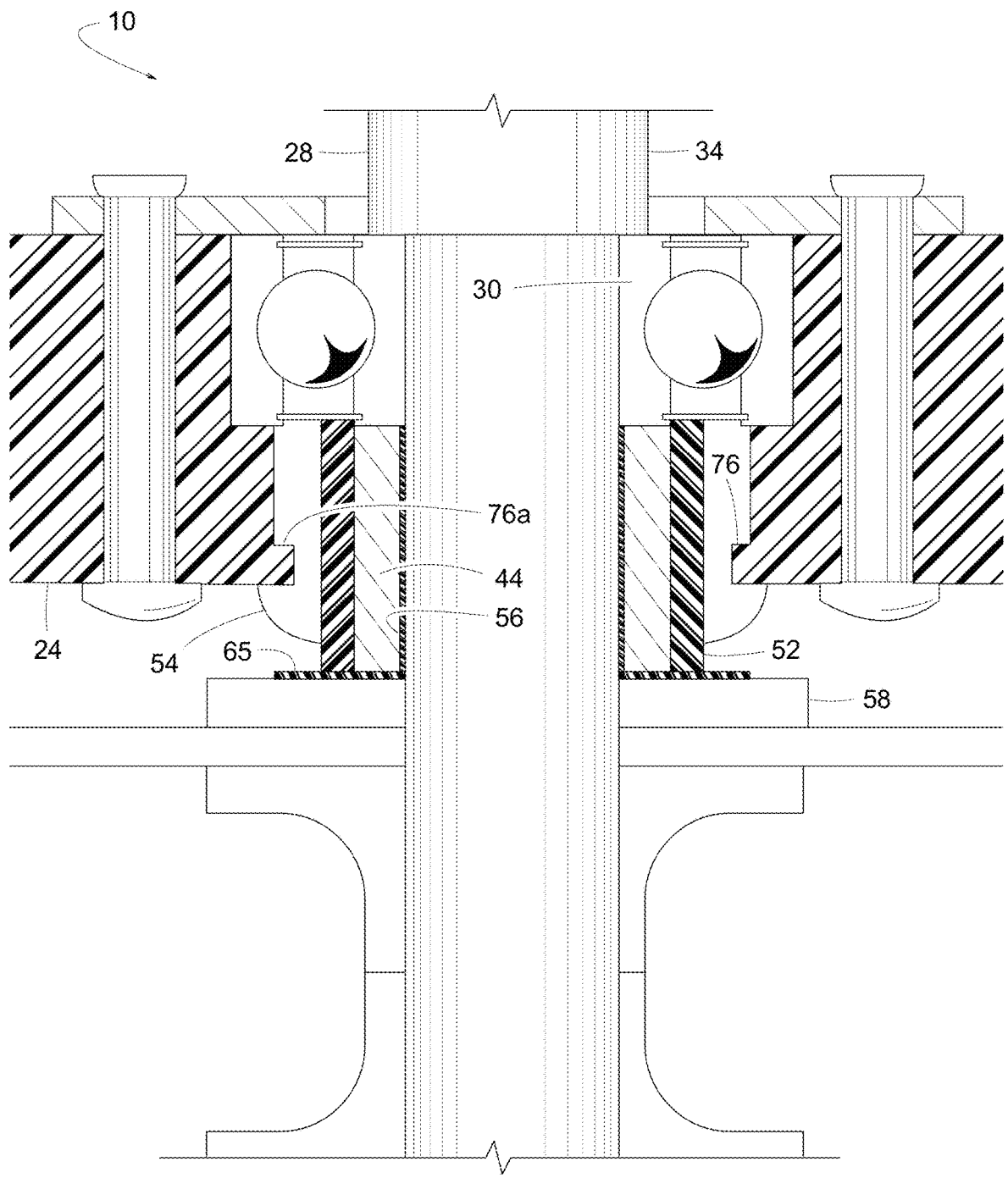
FIG. 6 is a cross-sectional view similar to FIG. 4 but showing an example reinforcement.
Figure 7:
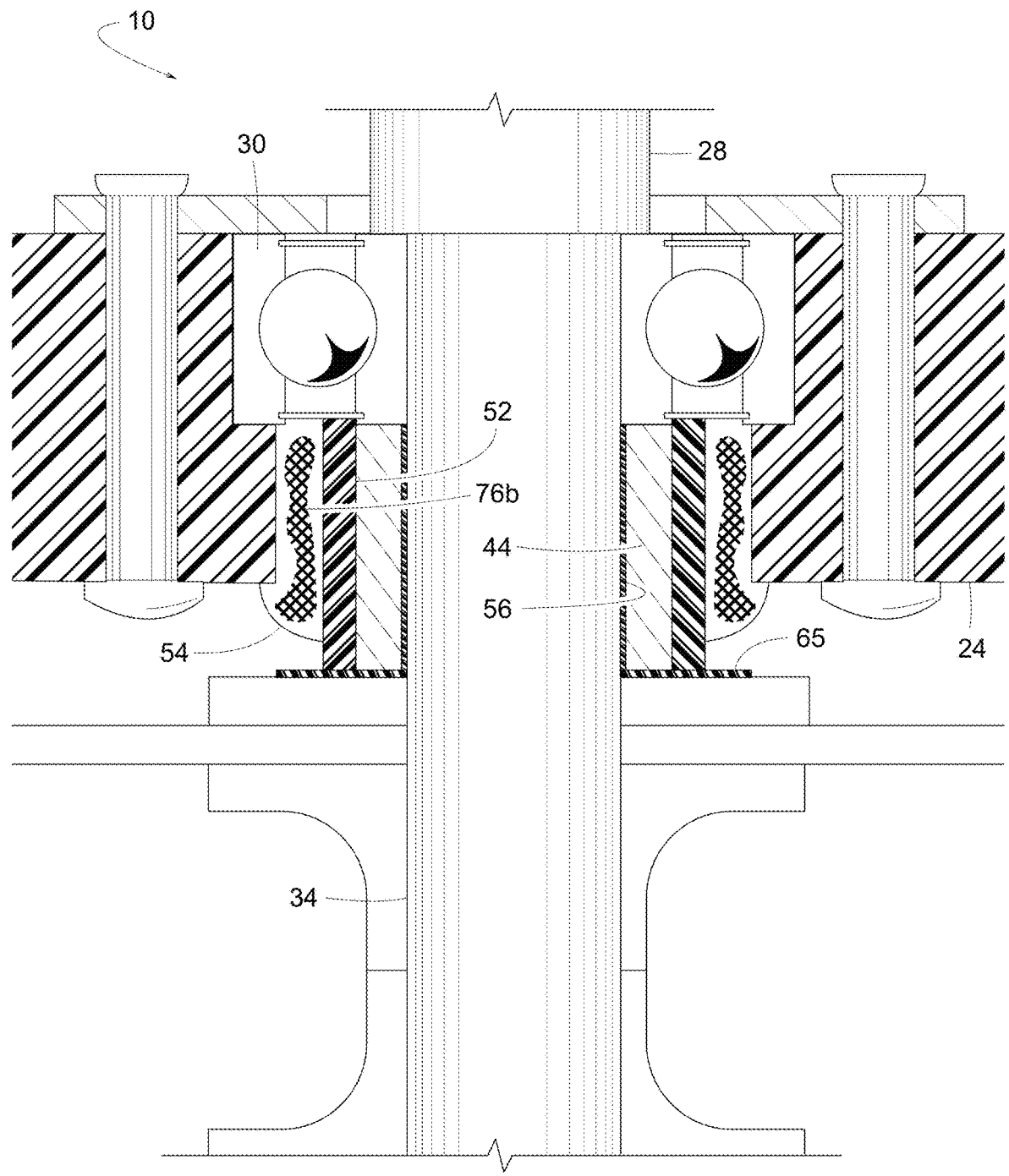
FIG. 7 is a cross-sectional view similar to FIG. 6 but showing another example reinforcement.

In some examples, the rotating sleeve 44 is made of metal, and the surrounding stationary tube 52 is made of polytetrafluoroethylene (TEFLON, PTFE). Teflon is a registered trademark of Chemours (formally DuPont of Wilmington, Delaware). The Teflon minimizes friction and withstands significant heat. The rotating sleeve 44, being made of metal, withstands the axial compressive forces of the nut 64. In some examples, a slight radial press-fit creates line-on-line sealing contact between the OD of the sleeve 44 and the ID of the tube 52. In other examples, the ID of the tube 52 is 0.0005 to 0.010 inches larger than the OD of the sleeve 44. The terms, OD and ID refers to outside diameter and inside diameter, respectively. Although FIG. 4 shows the tube 52 in axial contact with the support washer 58 and the bearing's shield 50, such axial contact is not required. Critical sealing is in the radial direction between the sleeve's OD and the tube's ID. In some examples, the sleeve 44 is omitted and the ID of the tube 52 contacts the OD of the shaft 34 directly.

To provide radial sealing between the OD of the tube 52 and the motor's inboard end 24, the annular space between them is filled with the outer adhesive 54, as shown in FIG. 4. In some examples, the outer adhesive 54 is made mostly of silicone glue. When cured, the silicone adheres surprisingly well to Teflon. Under normal operation, the tube 52, the outer adhesive 54 and the motor's inboard end 24 remain substantially stationary while the shaft 34 and the sleeve 44 rotate. In some examples, to enhance sealing, the outer adhesive 54 also engages the roller bearing's shield 50.

In some examples, there might be some radial clearance between the ID of the sleeve 44 and the OD of the shaft 34. To prevent moisture from passing through this radial clearance, some examples of the motor system 10 include the inner adhesive 56 to fill or seal off that pathway. In some examples, the inner adhesive 56 is Loctite 620; however, almost any type of adhesive could be used depending on the application or use of the motor system 10.

In addition or alternatively, some examples of the motor system 10 include the gasket 65 to inhibit moisture from seeping between the ID of the sleeve 44 and the OD of the shaft 34. In some examples, the gasket 65 is axially compressed between the support washer 58 and the axial end of the sleeve 44. In some examples, the axial compression of the gasket 65 also forces the gasket 65 to expand radially inward such that the ID of the gasket 65 presses radially inward against the OD of the shaft 34 for additional sealing. In some examples, the gasket 65 is made of a polymeric material (e.g., rubber, neoprene, polyurethane, etc.) that is more compressible than the metal support washer 58 and the sleeve 44 to provide effective sealing while maintaining accurate axial positioning of the plurality of the fan blades 60. So, in some examples, the gasket 65 is thinner than the support washer 58.

In addition or alternatively, some examples of the motor system 10 include a reinforcement 76 (e.g., reinforcement 76a of FIG. 6 and/or reinforcement 76b of FIG. 7.) embedded in the outer adhesive 54 to improve the outer adhesive's structural integrity. In some examples, the reinforcement 76 is stronger and/or stiffer than the outer adhesive 54. In the example shown in FIG. 6, the reinforcement 76a is an integral extension of the motor housing's inboard end 24. In some examples, the reinforcement 76a is in the form of ribs, flutes, tabs, or spikes on the motor housing's inboard end 24. In the example shown in FIG. 7, the reinforcement 76b is in the form of a mesh or fibers embedded within the outer adhesive 54.

Although certain example methods, apparatus, and articles of manufacture have been described herein, the scope of the coverage of this patent is not limited thereto. On the contrary, this patent covers all methods, apparatus, and articles of manufacture fairly falling within the scope of the appended claims either literally or under the doctrine of equivalents.

The invention claimed is:

1. A motor system comprising:
a stator;
a motor housing supporting the stator, the motor housing includes an inboard end and an outboard end, the stator being interposed in an axial direction between the inboard end and the outboard end, the inboard end defining a shaft opening;
a rotor assembly being in proximity with the stator and extending in an axial direction through the shaft opening;
a roller bearing being attached to the inboard end of the motor housing and providing the rotor assembly with support in a radial direction that is perpendicular to the axial direction;
a tube encircling and engaging the rotor assembly and being substantially stationary relative to the inboard end of the motor housing; and
an outer adhesive encircling the tube and bonded to both the tube and the inboard end of the motor housing at the shaft opening.

2. The motor system of claim 1, wherein the outer adhesive comprises mostly silicone, and the tube comprises mostly polytetrafluoroethylene.

3. The motor system of claim 1, wherein the outer adhesive engages the roller bearing.

4. The motor system of claim 1, further comprising a reinforcement embedded in the outer adhesive, the reinforcement being stiffer than the outer adhesive.

5. The motor system of claim 4, wherein the reinforcement extends integrally from the inboard end of the motor housing.

6. The motor system of claim 1, wherein the rotor assembly includes a shaft extending in the axial direction through the shaft opening, and the rotor assembly further includes a sleeve encircling the shaft and is rotatable therewith, wherein the tube encircles and engages the sleeve.

7. The motor system of claim 6, wherein the sleeve comprises a metal, the tube comprises a first polymer, the outer adhesive comprises a second polymer, and the first polymer is distinguishable from the second polymer.

8. The motor system of claim 6, further comprising an inner adhesive bonding the sleeve to the shaft.

9. The motor system of claim 6, further comprising:
a fan wheel on the shaft;
a gasket between the sleeve and the fan wheel; and
a threaded nut attached to the shaft such that the threaded nut clamps the gasket, the sleeve, and the fan wheel in axial compression.

10. The motor system of claim 9, wherein the inboard end of the motor housing defines a fluid outlet that is in fluid communication with the fan wheel.

11. A motor system comprising:
a stator;
a motor housing supporting the stator, the motor housing includes an inboard end and an outboard end, the stator being interposed in an axial direction between the inboard end and the outboard end;

a rotor assembly in proximity with the stator, the rotor assembly including a shaft extending in the axial direction through the inboard end of the motor housing;

a roller bearing being attached to the inboard end of the motor housing and providing the shaft with support in a radial direction that is perpendicular to the axial direction;

a sleeve encircling the shaft and being rotatable therewith, the sleeve being comprised of a metal;

a tube encircling the sleeve and being substantially stationary relative to the inboard end of the motor housing, the tube being comprised of a first polymer;

an outer adhesive encircling the tube and bonded to both the tube and the inboard end of the motor housing, the outer adhesive being comprised of a second polymer being different in material composition than the first polymer;

a fan wheel on the shaft; and a threaded nut attached to the shaft such that the threaded nut clamps, the sleeve, the tube, and the fan wheel in axial compression.

12. The motor system of claim 11, wherein the outer adhesive comprises mostly silicone, and the tube comprises mostly polytetrafluoroethylene.

13. The motor system of claim 11, wherein the outer adhesive engages the roller bearing.

14. The motor system of claim 11, further comprising an inner adhesive bonding the sleeve to the shaft.

15. The motor system of claim 11, further comprising a gasket between the sleeve and the fan wheel such that the threaded nut clamps the sleeve, the tube, the fan wheel, and the gasket in axial compression.

16. The motor system of claim 11, further comprising a reinforcement embedded in the outer adhesive, the reinforcement being stiffer than the outer adhesive.

17. The motor system of claim 16, wherein the reinforcement extends integrally from the inboard end of the motor housing.

18. A motor system comprising:

a stator;

a motor housing supporting the stator, the motor housing includes an inboard end and an outboard end, the stator being interposed in an axial direction between the inboard end and the outboard end;

a rotor assembly in proximity with the stator, the rotor assembly including a shaft extending in the axial direction through the inboard end of the motor housing;

a roller bearing being attached to the inboard end of the motor housing and providing the shaft with support in a radial direction that is perpendicular to the axial direction;

a sleeve encircling the shaft and being rotatable therewith, the sleeve being comprised of a metal;

a tube encircling the sleeve and being substantially stationary relative to the inboard end of the motor housing, the tube being comprised of mostly polytetrafluoroethylene;

an outer adhesive being comprised of mostly silicone and being bonded to the tube, to the inboard end of the motor housing, and to the roller bearing;

a plurality of fan wheels on the shaft; and a threaded nut attached to the shaft such that the threaded nut clamps, the sleeve, the tube, and the plurality of fan wheel in axial compression.

19. The motor system of claim 18, further comprising an inner adhesive bonding the sleeve to the shaft.

20. The motor system of claim 18, further comprising a gasket between the sleeve and the plurality of fan wheel such that the threaded nut clamps the sleeve, the tube, the plurality of fan wheels, and the gasket in axial compression.

* * * * *